(12) United States Patent
Lambrecht et al.

(10) Patent No.: US 12,709,165 B2
(45) Date of Patent: Aug. 18, 2026

(54) FORCE-BASED DETERMINATION OF A TARGET GEAR COMBINATION FOR A PLURALITY OF DRIVE SYSTEMS

(71) Applicant: MAN Truck & Bus SE, Munich (DE)

(72) Inventors: Felix Lambrecht, Munich (DE); Fabian Hoffmann, Munich (DE)

(73) Assignee: MAN Truck & Bus SE, Munich (DE)

( * ) Notice: Subject to any disclaimer, the term of this patent is extended or adjusted under 35 U.S.C. 154(b) by 0 days.

(21) Appl. No.: 19/235,573

(22) Filed: Jun. 12, 2025

(65) Prior Publication Data

US 2025/0340131 A1 Nov. 6, 2025

Related U.S. Application Data

(63) Continuation of application No. PCT/EP2023/085644, filed on Dec. 13, 2023.

(30) Foreign Application Priority Data

Dec. 13, 2022 (DE) ..................... 10 2022 133 142.3

(51) Int. Cl.
*B60L 15/20* (2006.01)
*B60L 15/32* (2006.01)

(52) U.S. Cl.
CPC ........... *B60L 15/2054* (2013.01); *B60L 15/32* (2013.01); *B60L 2200/36* (2013.01); *B60L 2240/12* (2013.01); *B60L 2240/26* (2013.01); *B60L 2240/64* (2013.01); *B60L 2240/68* (2013.01)

(58) Field of Classification Search
CPC .. B60L 15/2054; B60L 15/32; B60L 2200/36; B60L 2240/12; B60L 2240/26; B60L 2240/64; B60L 2240/68
See application file for complete search history.

(56) References Cited

U.S. PATENT DOCUMENTS

| | | | | |
|---|---|---|---|---|
| 10,279,674 | B2 | 5/2019 | Jung et al. | |
| 10,343,683 | B2 | 7/2019 | Zhang et al. | |
| 10,486,512 | B2 * | 11/2019 | Bassis | B60K 17/354 |
| 12,337,822 | B2 * | 6/2025 | Ramakrishnan | B60W 20/14 |
| 2015/0307086 | A1 | 10/2015 | Ketfi-Cherif | |
| 2023/0114911 | A1 * | 4/2023 | Tsuda | B60W 50/0097 701/22 |

FOREIGN PATENT DOCUMENTS

| | | | |
|---|---|---|---|
| DE | 10 2017 219756 | A1 | 5/2019 |
| DE | 10 2018 120026 | A1 | 2/2020 |
| JP | 2021027648 | A | 2/2021 |

OTHER PUBLICATIONS

International Search Report of PCT/EP2023/085644 mailed on Mar. 28, 2024.

* cited by examiner

*Primary Examiner* — Huan Le
(74) *Attorney, Agent, or Firm* — WTA IP Law P.C.

(57) ABSTRACT

A target gear combination for a vehicle having at least two drive systems is determined. Each of the two drive system drives a vehicle axle and each of the two drive systems has at least one electric motor and at least one transmission has at least two gears The target gear combination is determined based on one or more of a route profile lying ahead, a speed and/or an acceleration of at least one vehicle driving ahead or driving, and a distance from at least one vehicle driving ahead or driving behind.

17 Claims, 5 Drawing Sheets

FORCE-BASED DETERMINATION OF A TARGET GEAR COMBINATION FOR A PLURALITY OF DRIVE SYSTEMS

CROSS-REFERENCE TO RELATED APPLICATIONS

This is a bypass continuation of International PCT Application No. PCT/EP2023/085644, filed on Dec. 13, 2023, which claims priority to German Patent Application No. 10 2022 133 142.3, filed on Dec. 13, 2022, which are incorporated by reference herein in their entirety.

FIELD

The present disclosure relates to a method for determining a target gear combination for a vehicle, in particular a truck and/or a bus, for example a city bus, or a watercraft having at least two drive systems. The vehicle can be driven manually and/or by an automated driving system. During the determination of the target gear combination, in particular the route profile or parameters of other vehicles lying ahead are taken into account.

BACKGROUND

In vehicles which have only one drive system which is driven by an electric motor, the electric motor has to provide a high power in order to be able to sufficiently accelerate the vehicle, in particular a truck. Electric motors operate particularly efficiently from a power utilization of 50 percent and more. Therefore, electric motors which have a very high maximum power operate very inefficiently at low acceleration. Furthermore, it could be the case that only one electric motor, for example at full loading of the truck, cannot provide sufficient power in order to sufficiently accelerate the vehicle. Furthermore, the electric motors can overheat if they are operated with too high a power for too long. Therefore, electric motors can still be used to a limited extent in trucks.

By means of a plurality of drive systems with in each case at least one electric motor which in each case drive a drive axle of the vehicle, by contrast, the drive torques (braking torques) of the drive systems can be added up to form a sufficient total drive torque. For example, the use of a plurality of drive systems, with in each case at least one electric motor, makes it possible to use electric motors with a low power and nevertheless to ensure sufficient acceleration of the vehicle. In order to be able to change the total drive torque of the vehicle, it is advantageous to adapt the power range of an electric motor by means of a transmission. The plurality of drive systems results in a plurality of possible gear combinations of the transmissions of the drive systems. By means of the different gear combinations of the drive systems, in each case different maximum total drive torques and/or minimum resistance torques (braking torques) can be made available to the vehicle. Therefore, the correct gear combination has to be selected depending on the driving situation.

Furthermore, very different requirements are placed on vehicles, in particular on trucks or watercrafts, that is to say electric motors and/or transmissions with different torque characteristic curves are used in different vehicles in order to be able to adapt the power range and/or the power ranges of the total drive torque optimally to the requirements of the vehicle. Therefore, it is furthermore advantageous to specify a method for calculating a target gear combination which can be adapted automatically or simply to the different requirements of the vehicles.

SUMMARY

The object of the present invention is to provide a method for calculating the target gear combinations of the transmissions of drivetrains for vehicles having a plurality of drivetrains, which method can provide the drivetrains with a sufficient total driving force and/or total resistance force in a situationally reliable manner to the vehicle using a simple calculation method.

Furthermore, it is an object of the present invention to specify a method for calculating the target gear combination which can be transferred to any desired drivetrain concepts having a different number of gears of the transmissions and different torque characteristic curves of the transmissions and/or of the electric motors.

Furthermore, it is an object of the present invention to specify a method for calculating the target gear combination which can be adapted simply to different loadings of the vehicle or to a different vehicle weight.

Furthermore, it is an object of the present invention to take into account parameters of the route or of surrounding vehicles.

Furthermore, it is an object of the present invention to specify a vehicle which uses such a method or in which such a method is used.

The invention is based on the concept of using a plurality of motors when driving vehicles in order to increase a driving power of the vehicle. In this case, a plurality of electric motors of small or small dimensions can be used, wherein the vehicle can nevertheless apply a high driving power or the required driving power. For this purpose, the aim is to provide a method for selecting and activating a target gear combination for the transmissions which are present between the drive axles and the motors, which method firstly ensures that a sufficient torque can be provided by the drive axles and secondly ensures that the electric motors of the drive systems are utilized sufficiently, with the result that said electric motors are operated in an efficient working range. In order to be able to take into account a plurality of drive systems with in each case one electric motor and one transmission when determining the target gear combination, a method is specified which determines the target gear combination in a force-based manner, i.e. on the basis of a comparison of a longitudinal force requirement and a force which can be provided with the individual gear combinations of the transmissions of the two drive systems.

These objects are achieved by the features of the independent claims. Refinements are preferably specified in the dependent claims.

According to the invention, a method for determining a target gear combination for a vehicle with at least two drive systems or drivetrains is specified, wherein each drive system drives a vehicle axle and each of the two drive systems has at least one motor and at least one transmission, wherein at least one of the motors is an electric motor and at least one transmission has two gears; wherein the method comprises the following step: determining the target gear combination on the basis of a comparison of a longitudinal force requirement with maximum total driving forces and/or minimum total resistance forces of possible gear combinations of the at least two transmissions, wherein the maximum total driving forces are the sum of the maximum driving forces of the possible gear combinations and the minimum total resistance forces are the sum of the minimum resistance forces of the possible gear combinations; and/or wherein the longitudinal force requirement is determined on the basis of a route profile lying ahead; and/or wherein the longitudinal force requirement is determined on the basis of a speed and/or an acceleration of at least one vehicle travelling ahead and/or travelling behind and/or on the basis of a distance from at least one vehicle travelling ahead and/or travelling behind.

The target gear combination are the gears which the individual transmissions are intended to have or the gears into which the individual transmissions of the at least two drive systems are intended to be shifted. For example, the transmissions of the at least two drive systems have two, three or four gears. As a result of the individual gears of the transmissions of the at least two drive systems, the electric motors of the at least two drive systems can apply different torques to the vehicle axles at the same rotational speed of the electric motor.

The driven vehicle axles can be rear axles and/or front axles. The vehicle can also comprise only one rear axle which is driven by a drive system. Furthermore, the vehicle can also comprise two front axles, wherein one or both front axles can be driven. A plurality of front axles and/or a plurality of rear axles can also be driven and/or all vehicle axles can be driven.

The drive system for driving in each case one vehicle axle can comprise an electric motor. However, instead of the electric motor, the drive system can also comprise another and/or further motor, for example an internal combustion engine. Furthermore, the drive systems can be operated freely from one another, that is to say the drive systems are not in direct operative connection with one another. Each of the drive systems comprises one of the at least two transmissions.

The longitudinal force requirement is the force which the vehicle is intended to provide at the present time. The longitudinal force requirement takes account, for example, of how much force is currently being demanded by the vehicle by a driver and/or an automated driving system, and/or a force which will be necessary on account of a current road inclination and/or a road inclination in a route section lying ahead, and/or a force which represents an expected additional force input by the driver and/or the automated driving system.

The maximum total drive forces are maximum drive forces which the drive systems together in a selected gear combination can provide at the driven axles as a maximum in total, or the maximum drive forces with which the drive systems in a gear combination can accelerate the driven axles. The total drive forces are defined in the direction of travel of the vehicle and are therefore positive.

The minimum total resistance forces are the resistance forces which all the drive systems in a selected gear combination can provide at the driven axles in total, that is to say the resistance forces which are maximum in absolute value and with which the drive systems in a gear combination can brake the driven axles. The total resistance forces are defined counter to a direction of travel of the vehicle and are therefore negative. The minimum resistance forces are in absolute value positive and maximum resistance forces of the respective gear of the respective transmission, that is to say the combination of gears of the plurality of transmissions which apply a maximum resistance force (braking force).

For example, the longitudinal force demand is calculated on the basis of a route profile lying ahead.

The route profile lying ahead can be determined, for example, by digital map data and/or by the sensor system, for example LIDAR, RADAR or camera. For example, the vehicle is localized by GPS and/or characteristic landmarks, for example traffic signs, on the digital map. Subsequently, the route profile lying ahead can be divided, for example, into individual route sections lying ahead.

On account of the route profile lying ahead, the longitudinal force demand can be reduced during manual driving (via the accelerator pedal and/or brake pedal) and/or can even be omitted situationally during driving of an automated driving system.

Gradients and/or local entries and/or speed limits can be stored in the route profile lying ahead and/or in the individual route sections lying ahead. Furthermore, for example, speed profiles or acceleration profiles for the vehicle can be predefined for the route profile lying ahead and/or the individual route sections lying ahead. Furthermore, target speeds and/or target accelerations can be predefined at characteristic points, for example a local entry or a pass or a transition between positive and negative gradient, and a controller can calculate, for example, an energy- and/or time-optimum speed profile or acceleration profile for the vehicle on the route profile lying ahead and/or the individual route sections lying ahead. The longitudinal force demand can be determined predictively and in an energy-efficient manner on the basis of the speed profiles and/or acceleration profiles. On account of the speed profiles and/or acceleration profiles, the longitudinal force demand can be reduced during manual driving and/or can even be omitted situationally during driving of an automated driving system.

For example, the longitudinal force demand is calculated on the basis of a speed and/or acceleration of at least one vehicle driving ahead and/or driving behind and/or on the basis of a distance from at least one vehicle driving ahead and/or driving behind.

This can be used, for example, to design platooning in an energy-efficient manner. Platooning describes a system for road traffic, in which a plurality of vehicles can drive behind one another at a very small distance with the aid of a technical control system without impairing traffic safety. The speed and/or the acceleration of the vehicle driving ahead and/or of the vehicle driving behind can be the current speed and/or acceleration of the vehicle driving ahead and/or of the vehicle driving behind and/or a planned speed and/or acceleration of the vehicle driving ahead and/or of the vehicle driving behind. The distance from at least one vehicle driving ahead and/or driving behind can be a current distance and/or a planned distance from at least one vehicle driving ahead and/or driving behind. The speed and/or the acceleration of and/or the distance from a plurality of vehicles driving ahead and/or driving behind can also be taken into account at the same time.

For example, at the start of the method or during initialization of the algorithm, firstly the at least two transmissions of the at least two drive systems are idling.

For example, the method is started or initialized as soon as the longitudinal force demand is made for the first time after a start of the vehicle and/or after a standstill of the vehicle.

The determination of the target gear combination takes place via a comparison of forces which are intended to act on the wheel and can act to the maximum extent and are therefore purely force-based. As a result, the vehicle mass is automatically taken into account in the calculation and the same method can be used for different torque characteristic curves of the transmissions and of the electric motors, in the case of different vehicle types and in the case of different loading.

Preferably, the determination of the maximum total drive forces and of the minimum total resistance forces takes into account gear combinations as the possible gear combinations in which at least one of the at least two transmissions is idling. Preferably, the idling of one or more transmissions of the drive systems is taken into account as an additional gear in the determination of the gear combinations.

It is also possible, depending on the speed, to omit different gears in the selection or target gear determination, since the activation thereof is improbable or technically impossible. Therefore, the number of practically selectable gears can be restricted and some theoretically possible gear combinations can be disregarded in the practical selection.

As a result, it can be ensured, for example, that the electric motors of the individual drive systems are operated with favorable force utilization. For this purpose, it may be more expedient in terms of energy to deactivate at least one drive system or to operate the transmissions thereof in idling and for this purpose to load the other drive system or the other drive systems to a greater extent and therefore to operate them in a more energy-efficient range. The electric motor can operate in an energy-efficient manner, for example, if the electric motor provides 50 percent or more of its maximum torque. Therefore, for example, the vehicle can be operated in a situationally more energy-efficient manner if a drive system is operated in idling and as a result the electric motor of a further drive system is utilized to a greater extent, that is to say for example provides more than 50 percent of its maximum torque.

Preferably, in the method for determining the target gear combination, if the longitudinal force demand is greater than and/or equal to zero, the target gear combination is determined by a comparison of the longitudinal force demand with the maximum total drive forces and is otherwise determined by a comparison with the minimum total resistance forces.

If the longitudinal force demand is positive, it is assumed, for example, that the vehicle is accelerated by the user and/or the automated driving system and/or on account of a positive gradient. Therefore, the target gear combination can be determined which can provide the vehicle with a sufficient or as great as possible total drive torque. If the longitudinal force demand is negative, it can be assumed, for example, that the vehicle is braked by the user and/or the automated driving system, for example on account of a negative gradient. Therefore, the target gear combination can be determined which can provide the vehicle with a sufficient or as great as possible total resistance torque.

Preferably, in the method for determining the target gear combination, if no maximum total drive force is greater than and/or equal to the longitudinal force demand, the gear combination which has the maximum total drive force is selected as the target gear combination. As a result, it can be ensured that the drive systems can be fully utilized.

Preferably, in the method for determining the target gear combination, if no maximum total resistance force is less than and/or equal to the longitudinal force demand, the gear combination which has the minimum total resistance force is selected as the target gear combination. As a result, it can be ensured that the drive systems can be fully utilized.

Preferably, in the method for determining the target gear combination, the target gear combination is determined in such a way that a gear combination is selected in which the gear is changed only in the smallest possible number of the at least two transmissions.

For example, it is first checked whether the actual gear combination is a gear combination with sufficient total drive force or total resistance force. If this is not the case, it can be checked whether a gear combination can be used as the target gear combination, i.e. a gear combination is one of the gear combinations with sufficient total drive force or total resistance force in which a gear has to be changed only in the transmission of one of the drive systems. If this is not the case, it is checked whether a gear combination can be used as the target gear combination in which a gear has to be changed only in two transmissions, etc., in order to ensure that a force or a torque can be transferred at as many drive axles as possible at the same time, during a shifting operation.

Preferably, if in a plurality of gear combinations in which in each case the same smallest possible number of gears is changed, that gear combination which has the smallest of the maximum total drive forces and/or the greatest of the minimum total resistance forces is selected. As a result, the drive systems can operate in the gear combination which is most energy-efficient for the vehicle.

Preferably, the longitudinal force demand is determined from a force reserve and a force input.

The force input can be generated or predefined by the driver and/or by the automated driving system. The driver outputs the force input, for example, via a position of an accelerator pedal or via an accelerator pedal position and/or a position of a brake pedal or via a brake pedal position. Subsequently, the accelerator pedal position and/or brake pedal position is converted into a force input. The automated driving system calculates, for example, a target acceleration which is converted into the force input, for example, by multiplication with a vehicle mass. The target acceleration is preferably the acceleration in the longitudinal direction of the vehicle. The force input can also be predefined, for example, in a combined manner by the driver and the automated driving system, for example, in the case of a hill starting assistant, the force input of the automated driving system can prevent the vehicle from rolling back on the hill and accelerate the vehicle by the force input of the driver.

Preferably, in the determination of the target gear combination, the force reserve is determined from an acceleration reserve and a vehicle mass.

The force reserve can be equal to the vehicle mass times the vehicle acceleration. The vehicle mass can be a measured value and/or an estimated value. The vehicle mass can either be measured by means of a sensor system or determined, for example, indirectly by means of the acceleration behavior of the vehicle.

The acceleration reserve is a value for how much the total drive force and/or the total resistance force is already utilized, i.e. the acceleration reserve indicates how much the vehicle can still be accelerated and/or decelerated in the current gear combination. Furthermore, the acceleration reserve can determine, as a function of a maximum vehicle acceleration and a maximum vehicle deceleration and a vehicle acceleration or vehicle deceleration, how much the vehicle is intended to be still accelerated and/or braked, for example without exceeding system limits of the vehicle and being able to provide the driver with good drivability.

Preferably, the acceleration reserve is determined from a force utilization and an acceleration utilization.

Preferably, the acceleration reserve is determined from a characteristic map which has a value for each force utilization and acceleration utilization, wherein, if the force input is greater than or equal to zero, the value is multiplied by a maximum vehicle acceleration and/or the value is otherwise multiplied by a maximum vehicle deceleration.

The maximum acceleration depends, for example, on the vehicle type and/or a current vehicle speed. Furthermore, the maximum acceleration can be determined in such a way that the energy efficiency during driving is increased. The maximum deceleration depends, for example, on the vehicle type and/or on the vehicle mass. Furthermore, the maximum deceleration can be determined in such a way that the energy efficiency during driving is increased.

Preferably, if the force input is greater than or equal to zero, the force utilization is determined from a ratio of the force input to a maximum total drive force of an actual gear combination of the at least two transmissions and/or the force utilization is otherwise determined from a ratio of the force input to a maximum total resistance force of the actual gear combination of the at least two transmissions.

Preferably, if the force input is greater than and/or equal to zero, the acceleration utilization is determined from a ratio of a vehicle acceleration to the maximum vehicle acceleration and/or the acceleration utilization is otherwise determined from a ratio of a vehicle deceleration to the maximum vehicle deceleration.

The vehicle acceleration corresponds to a positive acceleration or an acceleration equal to zero and the vehicle deceleration corresponds to a negative acceleration. The vehicle acceleration and the vehicle deceleration are preferably specified on the same signal or the vehicle acceleration and the vehicle deceleration are preferably specified on the same value in a specific numerical range.

For example, the acceleration reserve is calculated on the basis of a route profile lying ahead.

The route profile lying ahead can be determined, for example, by digital map data and/or by the sensor system, for example LIDAR, RADAR or camera. For example, the vehicle is localized by GPS and/or characteristic landmarks, for example traffic signs, on the digital map. Subsequently, the route profile lying ahead can be divided, for example, into individual route sections lying ahead.

On account of the route profile lying ahead, the acceleration reserve can be reduced during manual driving (via the accelerator pedal and/or brake pedal) and/or can even be omitted situationally during driving of an automated driving system.

Gradients and/or local entries and/or speed limits can be stored in the route profile lying ahead and/or in the individual route sections lying ahead. Furthermore, for example, speed profiles or acceleration profiles for the vehicle can be predefined for the route profile lying ahead and/or the individual route sections lying ahead. Furthermore, target speeds and/or target accelerations can be predefined at characteristic points, for example a local entry or a pass or a transition between positive and negative gradient, and a controller can calculate, for example, an energy- and/or time-optimum speed profile or acceleration profile for the vehicle on the route profile lying ahead and/or the individual route sections lying ahead. The acceleration reserve can be determined predictively and in an energy-efficient manner on the basis of the speed profiles and/or acceleration profiles. On account of the speed profiles and/or acceleration profiles, the acceleration reserve can be reduced during manual driving and/or can even be omitted situationally during driving of an automated driving system.

For example, the acceleration reserve is calculated on the basis of a speed and/or acceleration of at least one vehicle driving ahead and/or driving behind and/or on the basis of a distance from at least one vehicle driving ahead and/or driving behind.

This can be used, for example, to design platooning in an energy-efficient manner. Platooning describes a system for road traffic, in which a plurality of vehicles can drive behind one another at a very small distance with the aid of a technical control system without impairing traffic safety. The speed and/or the acceleration of the vehicle driving ahead and/or of the vehicle driving behind can be the current speed and/or acceleration of the vehicle driving ahead and/or of the vehicle driving behind and/or a planned speed and/or acceleration of the vehicle driving ahead and/or of the vehicle driving behind. The distance from at least one vehicle driving ahead and/or driving behind can be a current distance and/or a planned distance from at least one vehicle driving ahead and/or driving behind. The speed and/or the acceleration of and/or the distance from a plurality of vehicles driving ahead and/or driving behind can also be taken into account at the same time.

Preferably, the force input is limited. The force input is preferably limited before the acceleration reserve, the force reserve and the force input are calculated. The limitation of the force input can also take place only if the force input is greater than zero. If the force input is less than zero, it can be advantageous not to limit the force input downwards in order to be able to provide the vehicle with a maximum braking torque (maximum recuperation).

Preferably, the limited force input is determined from the minimum of the force input and a sum of a resistance acceleration and the maximum vehicle acceleration times the vehicle mass.

The resistance acceleration depends on a rolling resistance and/or a gradient. The rolling resistance and/or the gradient or road inclination can be determined, for example, by sensors. Furthermore, the rolling resistance and/or the gradient can be read out from the route profile lying ahead and/or individual route sections lying ahead.

The present invention comprises a non-transitory, computer-readable storage medium for physically storing computer program instructions which can be executed by a processor, wherein the computer program instructions define the method for determining the target gear combination.

Furthermore, the present invention comprises a vehicle having at least two drive systems for driving in each case one vehicle axle, wherein each drive system comprises: an electric motor and at least one transmission with in each case at least two gears, wherein the electric motor is in operative connection with the transmission; and a controller which is configured to carry out the method for determining the target gear combination.

BRIEF DESCRIPTION OF THE DRAWINGS

The invention is described in detail below on the basis of the figures.

DETAILED DESCRIPTION

Unless noted otherwise, the same reference signs are used below for identical and identically acting elements.

Figure 1:
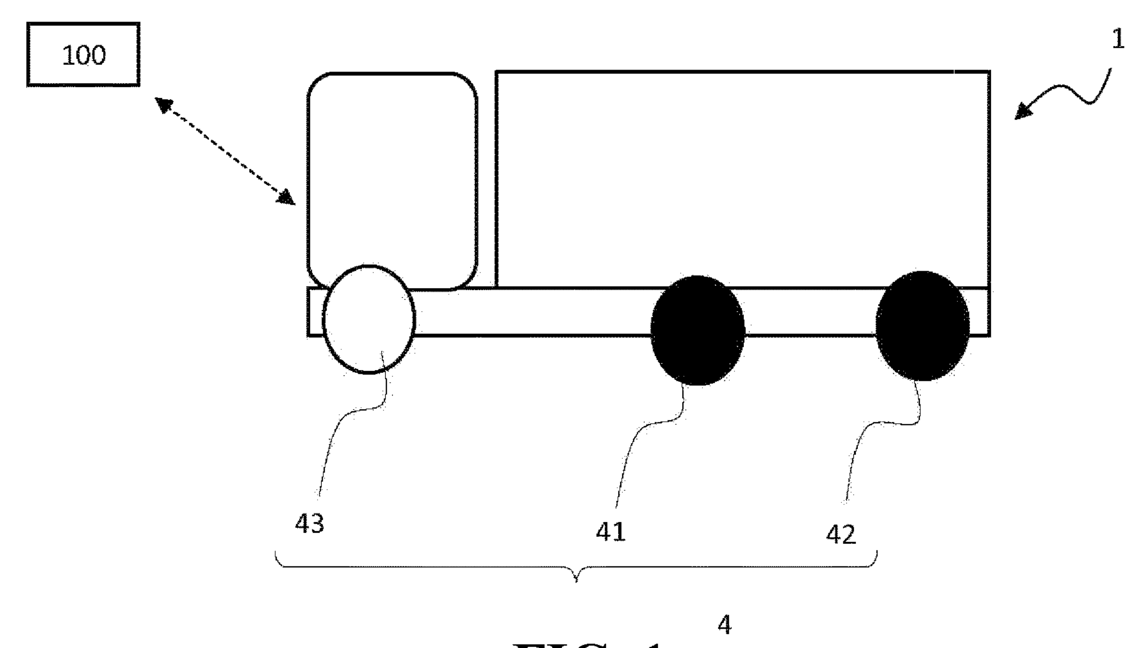
FIG. 1 shows a vehicle having a controller which is configured to carry out a method for determining a target gear combination.

FIG. 1 shows a vehicle 1, in particular a truck, having three vehicle axles 4. The vehicle 1 comprises a front axle 43 and a first rear axle 41 and a second rear axle 42. The first rear axle 41 lies between the front axle 43 and the second rear axle 42. The vehicle 1 furthermore comprises a controller 100 which is configured to carry out a method for determining a target gear combination.

Figure 2:
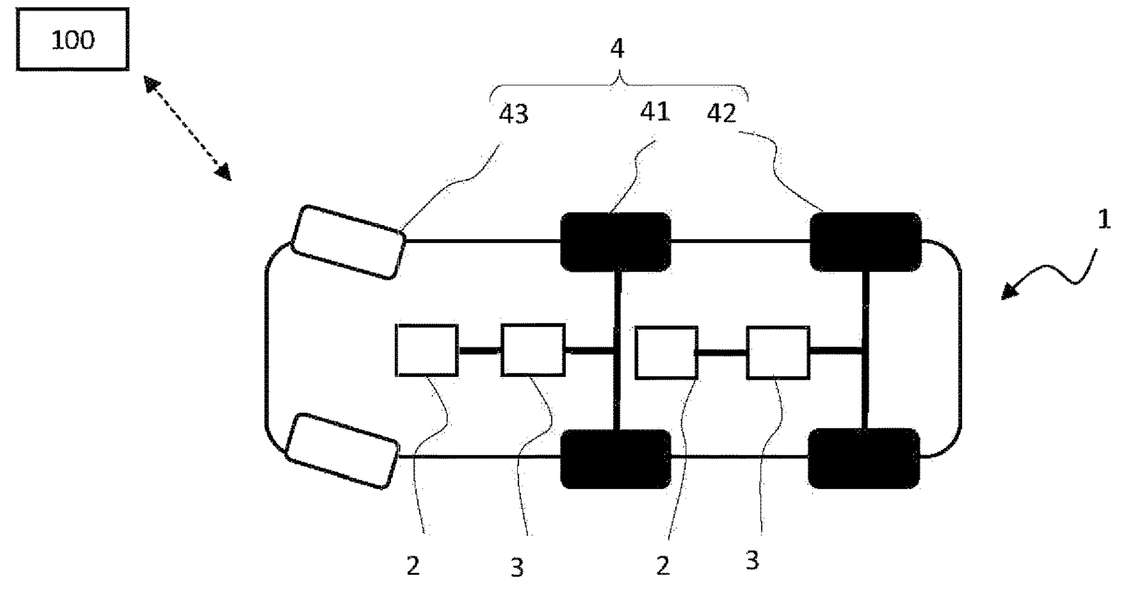
FIG. 2 shows the vehicle which is illustrated in FIG. 1 from below.

FIG. 2 shows the vehicle 1 which is illustrated in FIG. 1 from below. The first rear axle 41 and the second rear axle 42 are in each case driven by an electric motor 2. In each case one transmission 3 is arranged between the first rear axle 41 and the second rear axle 42 and the respective electric motor 2.

Figure 3:
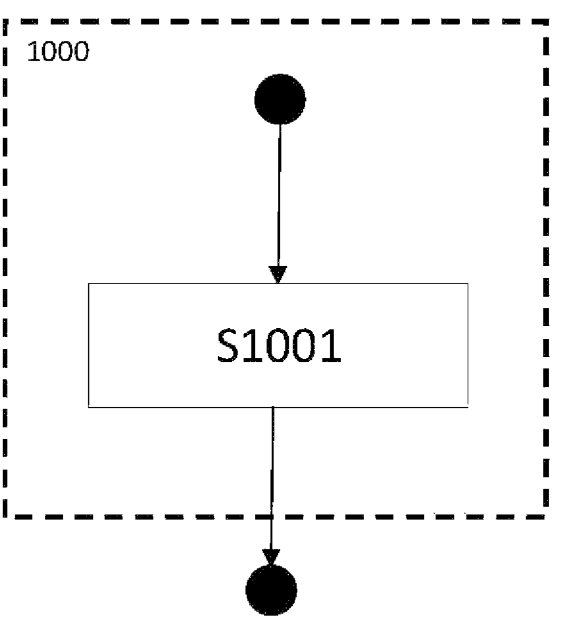
FIG. 3 shows a flow diagram of a method for determining a target gear combination.

FIG. 3 shows the method for determining the target gear combination 1000 which comprises a step S 1001 for determining the target gear combination on the basis of a comparison of a longitudinal force demand with maximum total drive forces and/or minimum total resistance forces of possible gear combinations of the at least two gears of the at least two transmissions.

Figure 4:
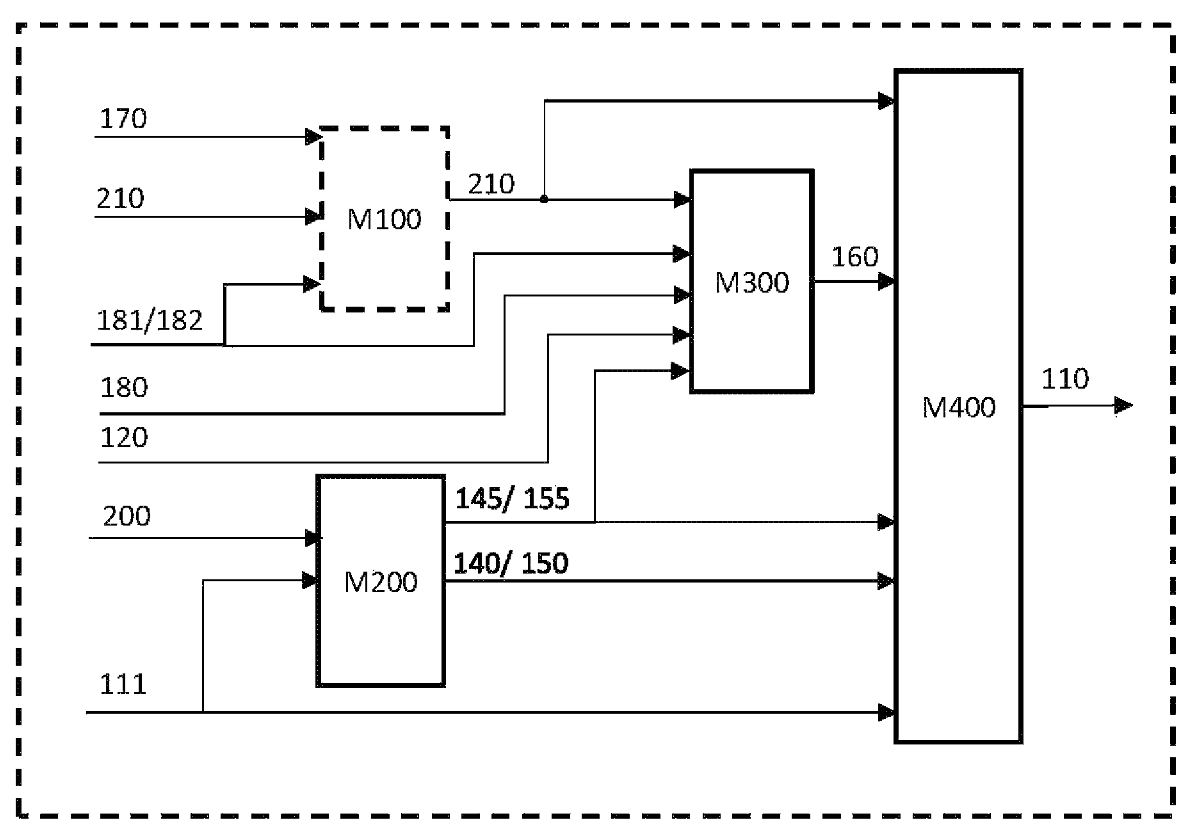
FIG. 4 shows a block diagram which is configured to carry out a method for determining the target gear combination.

FIG. 4 shows a block diagram for determining the target gear combination 110 which is configured to carry out the method for determining the target gear combination 1000.

The block diagram shows a module for determining a limited force input M 100, a module for determining total drive forces M 200 (or for determining total resistance forces), a module for determining a force reserve M 300 and a module for determining a target gear combination M 400.

The module for determining the target gear combination M 400 can be configured to determine the target gear combination 110. The input variables of the module for determining the target gear combination M 400 can be a force input 210, a force reserve 160, maximum total resistance forces of the possible gear combinations 150, maximum total drive forces of the possible gear combinations 140, a minimum total resistance force of the actual gear combination 155 and a maximum total drive force of the actual gear combination 145. The force reserve 160 indicates how much force, drive force or resistance force, is intended to be held in reserve in addition to the force input.

For example, the module for determining the force reserve M 300 is configured to determine the force reserve 160. The input variables of the module for determining the force reserve M 300 are, for example, the force input 210, a maximum vehicle acceleration 181 and a maximum vehicle deceleration 182, a vehicle acceleration or vehicle deceleration 180, a vehicle mass 120, the maximum total drive force of the actual gear combination 145 and the minimum total resistance force of the actual gear combination 155.

The maximum vehicle acceleration 181 and/or the maximum vehicle deceleration 182 depends, for example, on a vehicle speed or the current vehicle speed and/or on a vehicle type. However, the maximum vehicle acceleration 181 and/or the maximum vehicle deceleration 182 can also depend on a route profile lying ahead. The route profile lying ahead can be determined, for example, by a digital map or by a sensor system of the vehicle. The vehicle acceleration or vehicle deceleration 180 is a current acceleration value of the vehicle. The vehicle acceleration or vehicle deceleration 180 can be positive, negative or zero. The maximum total drive force of the actual gear combination 145 is a force which the drive systems of the vehicle in the current gears of the transmissions of the drive systems can provide at the maximum to the vehicle for acceleration. The minimum total resistance force of the actual gear combination 155 is a force with which the drive systems of the vehicle in the current gears of the transmissions of the drive systems can brake the vehicle at the maximum.

The force input 210 can be limited. For example, the module for determining the limited force input M 100 is configured to determine the limited force input 210 (illustrated by dashed lines). The module for determining the limited force input M 100 is optional. The module for determining the limited force input 210 can have, for example, as input variables the driving input 210 or an as yet unlimited force input 210, an environmental acceleration 170, the maximum vehicle acceleration 181 and/or the maximum vehicle deceleration 182. The environmental acceleration 170 is determined, for example, on the basis of a gradient of the road. The gradient can be the current gradient and/or the gradient from a route profile lying ahead. The route profile lying ahead can be read out, for example, from a digital map and/or determined by a vehicle sensor, for example a camera. Furthermore, the environmental acceleration 170 can also be calculated from a route profile lying ahead and also from state variables of surrounding vehicles. The state variables of the surrounding vehicles are, for example, a distance from the surrounding vehicle, a speed of the surrounding vehicle, the acceleration and/or the jerk of the surrounding vehicle. For example, the surrounding vehicle is a vehicle in front of and/or behind the vehicle which uses the method for target gear determination. The environmental acceleration 170 can be positive or negative.

Figure 5:
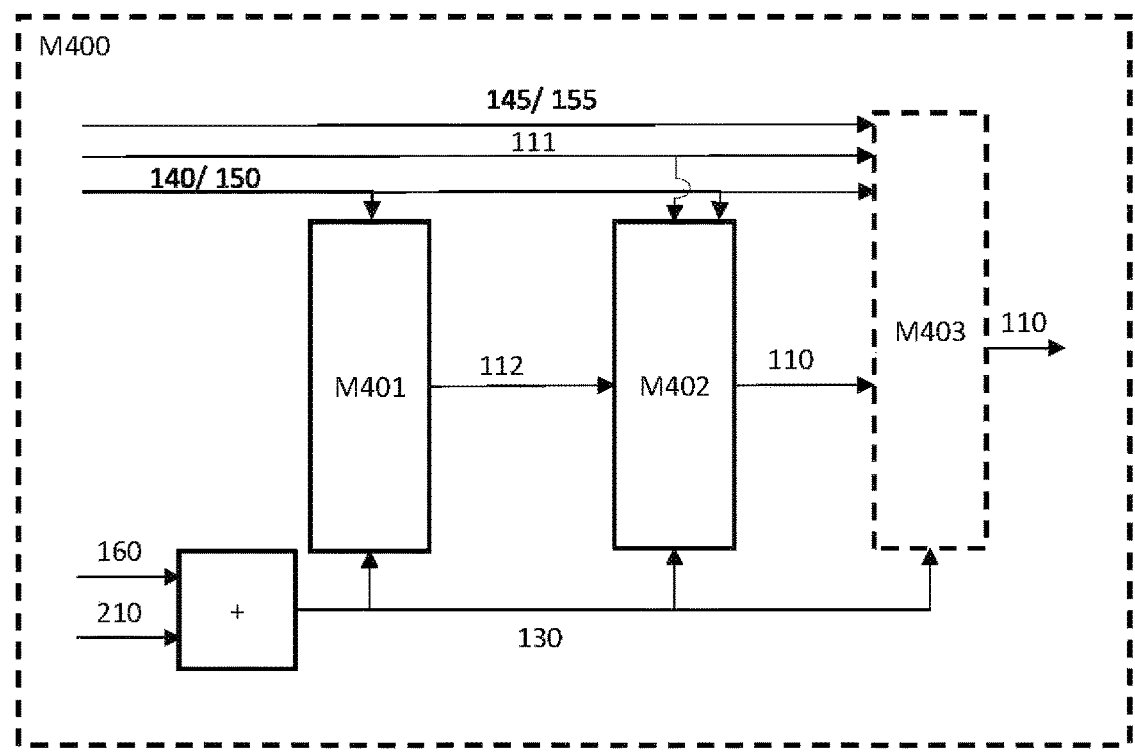
FIG. 5 shows a block diagram of the module for determining a target gear combination which is illustrated in FIG. 3 and is configured to determine the target gear combination.

An exemplary embodiment of the module for determining the target gear combination M 400 is illustrated in FIG. 5. The module for determining the target gear combination M 400 comprises, for example, a module for determining possible target gear combination M 401, a module for determining optimum gear combinations M 402 and a module for forming a hysteresis. First, a longitudinal force demand 130 is determined in the module for determining the target gear combination M 400. The longitudinal force demand 130 is calculated, for example, from the sum of the force reserve 160 and the force input 210. The module for determining possible target gear combinations M 401 can be configured to determine the gear combinations with sufficient total drive force or total resistance force 112. Input variables of the module for determining possible target gear combinations M 401 can be the longitudinal force demand 130 and the maximum total drive forces of the possible gear combinations 140 and the maximum total drive forces of the possible gear combinations 150. The module for determining the optimum gear combination M 402 can be configured to determine the target gear combination 110. Input variables of the module for determining the optimum gear combination M 402 can be the gear combinations with sufficient total drive force or total resistance force 112. The module for forming the hysteresis M 403 (illustrated by dashed lines) is optional.

The module for forming the hysteresis M 403 can be configured to prevent the target gear combination from changing too often. Input variables of the module for forming the hysteresis M 403 can be the longitudinal force demand 130, the maximum total drive forces of the possible gear combinations 140, the minimum total resistance forces of the possible gear combinations 150, an actual gear combination 111, a maximum total drive force of the actual gear combination 145 and a minimum total resistance force of the actual gear combination 155. The module for forming the hysteresis M 403 is configured, for example, to change the target gear combination 110 only if the longitudinal force demand 130 can no longer be satisfied by the actual gear combination 110, i.e. if a comparison of the maximum total drive force of the actual gear combination 145 is less than and/or equal to the longitudinal force demand 130 and/or if a comparison of the minimum total resistance force of the actual gear combination 155 is greater than and/or equal to the longitudinal force demand 130. A safety parameter can be taken into account during this comparison. Furthermore, the module for forming the hysteresis M 403 can be configured to wait, after a change of the target gear combination 110, for a time until a renewed change of the target gear combination 110 is possible. Furthermore, the module for forming the hysteresis M 403 can be configured to reduce oscillations of the longitudinal force demand 130, for example by means of a low-pass filter, before the longitudinal force demand 130 is used for determining the target gear combination 110.

Figure 6:
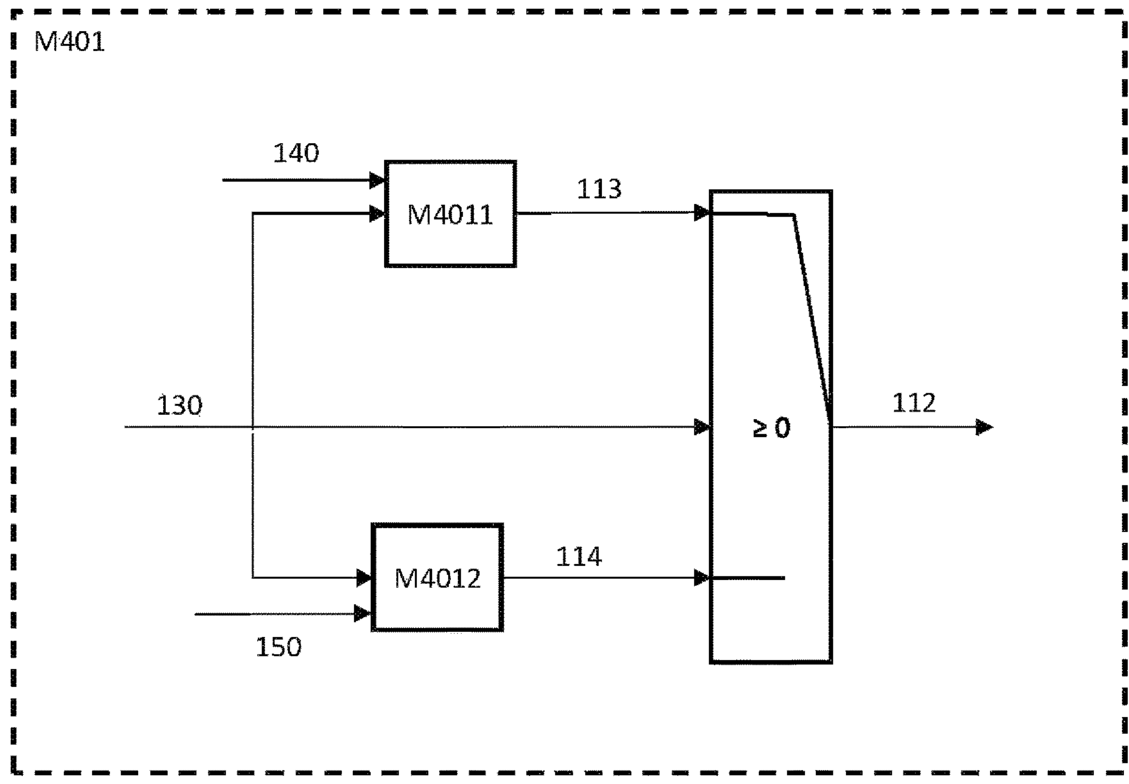
FIG. 6 shows a block diagram of a module which is arranged in the module for determining a target gear combination which is illustrated in FIG. 4 and is configured to determine the possible gear combinations.

The module for determining possible target gear combinations M 401 which is configured to determine gear combinations with sufficient total drive force or total resistance force 112 is illustrated by way of example in FIG. 6. The module for determining possible target gear combinations M 401 can comprise a comparison module M 4011 and a comparison module M 4012. The comparison module 4011 can be configured to determine the gear combinations with sufficient total drive force 113 on the basis of the longitudinal force demand 130 and the maximum total drive forces of the possible gear combinations 140, that is to say gear combinations with sufficient total drive force 113 can be those gear combinations whose maximum total drive forces are greater than and/or equal to the longitudinal force demand 130. The comparison module 4012 can be configured to determine the gear combinations with sufficient total resistance force 114 on the basis of the longitudinal force demand 130 and the maximum total resistance forces of the possible gear combinations 150, that is to say gear combinations with sufficient total drive force 114 can be those gear combinations whose maximum total drive forces are less than and/or equal to the longitudinal force demand 130. By way of example, the module for determining possible target gear combinations M 401 is configured, if the longitudinal force demand 130 is greater than and/or equal to zero, to select the gear combinations with sufficient total drive force 140 as gear combinations with sufficient total drive force or total resistance force 112 and otherwise to select the gear combinations with sufficient total resistance force 150 as gear combinations with sufficient total drive force or total resistance force 112.

Figure 7:
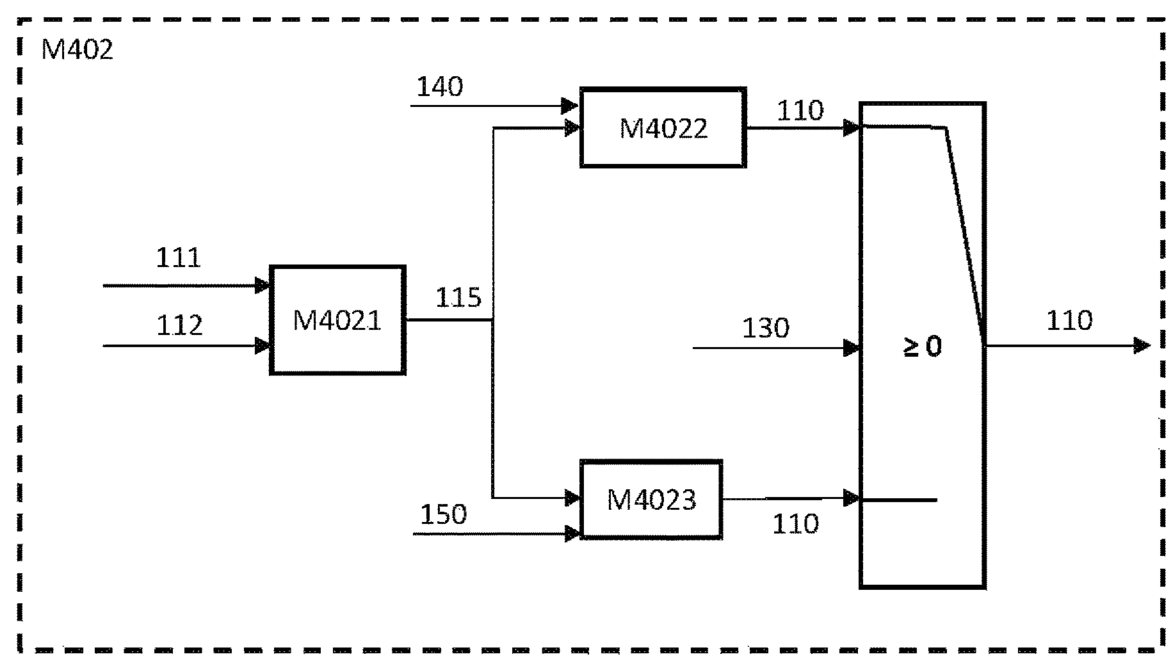
FIG. 7 shows a block diagram of a module which is arranged in the module for determining a target gear combination which is illustrated in FIG. 4 and is configured to determine the optimum gear combination.

The module for determining the optimum gear combination M 402 which is configured to determine the target gear combination 110 is illustrated by way of example in FIG. 7. The module for determining the optimum gear combination M 402 can comprise a comparison module M 4021, a comparison module M 4022 and a comparison module M 4023.

The comparison module M 4021 can be configured to determine, from an actual gear combination 111 and a gear combination with sufficient total drive force or total resistance force 112, those gear combinations with the smallest possible changes in the gears of the transmissions of the drive systems 115. The comparison module M 4021 is configured, for example, to first check whether the actual gear combination 111 is one of the gear combinations with sufficient total drive force or total resistance force 112. If this is the case, the actual gear combination 111 can be selected as gear combinations with the smallest possible changes in the gears of the transmissions of the drive systems 115. If this is not the case, the comparison module M 4021 can be configured to determine, by a comparison of the actual gear combination 111 with the gear combinations with sufficient total drive force or total resistance force 112, those gear combinations as gear combinations with the smallest possible changes in the gears of the transmissions of the drive systems 115 in which only one gear, subsequently two gears, etc. of the at least two transmissions has or have to be changed.

The comparison module M 4022 can be configured to determine the target gear combination 110 by a comparison of the gear combinations with the smallest possible changes in the gears of the transmissions of the drive systems 115 and the maximum total drive forces of the possible gear combinations 140. That gear combination of the gear combinations with the smallest possible changes in the gears of the transmissions of the drive systems 115 which has the smallest total drive force can be selected as the target gear combination 110. If, for example, there are no gear combinations with sufficient total drive force or total resistance force 112 and therefore also no gear combinations with small changes in the gears of the transmissions of the drive systems 115, the comparison module can furthermore be configured to select that gear combination which has the greatest total drive force as the target gear combination 110.

The comparison module M 4023 can furthermore be configured to determine the target gear combination 110 by a comparison of the gear combinations with the smallest possible changes in the gears of the transmissions of the drive systems 115 and the maximum total resistance forces of the possible gear combinations 150. That gear combination of the gear combinations with the smallest possible changes in the gears of the transmissions of the drive systems 115 which has the greatest total resistance force can be selected as the target gear combination 110. If, for example, there are no gear combinations with sufficient total drive force or total resistance force 112 and therefore also no gear combinations with small changes in the gears of the transmissions of the drive systems 115, the comparison module can furthermore be configured to select that gear combination which has the smallest total resistance force as the target gear combination 110.

The target gear combination 110 can be an output variable of the comparison module M 4022 and an output variable of the comparison module M 4023. Therefore, the module for determining the optimum gear combination 110 can furthermore be configured to select the output variable of the comparison module M 4022 or the output variable of the comparison module M 4023 as the target gear combination 110 depending on the longitudinal force demand 130. By way of example, the module for determining the optimum gear combination is configured to select the output variable of the comparison module M 4022 as the target gear combination 110 if the longitudinal force demand 130 is greater than and/or equal to zero. Furthermore, the module for determining the optimum gear combination can be configured, if the longitudinal force demand 130 is less than and/or equal to zero, to select the output variable of the comparison module M 4023 as the target gear combination 110.

Figure 8:
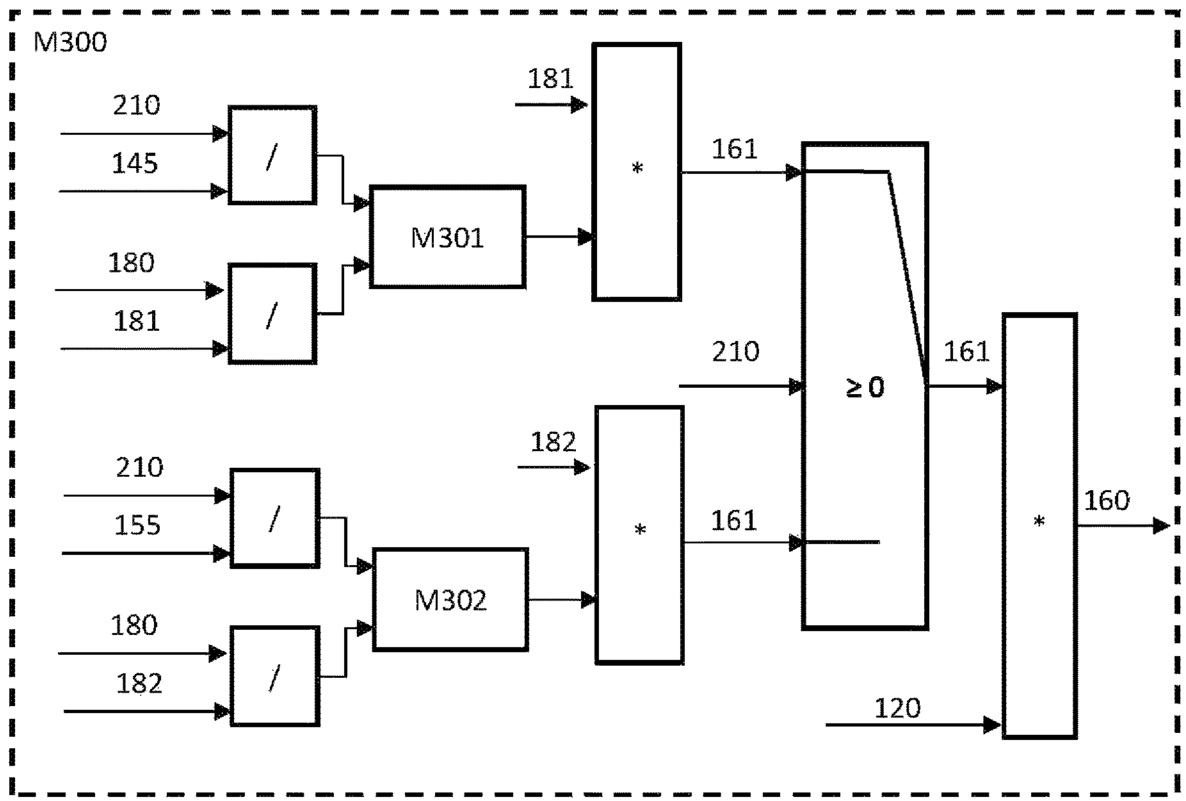
FIG. 8 shows a block diagram of a module for determining a target gear combination which is illustrated in FIG. 3 and is configured to determine a force reserve.

The module for determining the force reserve M 300 which is configured to calculate the force reserve 160 is illustrated by way of example in FIG. 8. The module for determining the force reserve M 300 comprises the characteristic map M 301 and the characteristic map M 302. The module for determining the force reserve M 300 can be configured to determine the force reserve from an acceleration reserve 161 and a vehicle mass 120. For this purpose, for example, the acceleration reserve 161 can be multiplied by the vehicle mass 120. The module for determining the force reserve M 300 can be configured to determine the acceleration reserve 161 for a braking case and a drive case. The module for determining the force reserve M 300 can be configured to determine the acceleration reserve 161 for the drive case if the force input is greater than and/or equal to zero and otherwise to determine the acceleration reserve 161 for the braking case. The module for determining the force reserve M 300 can be configured to first determine a force utilization and an acceleration utilization. The force utilization in the drive case can be a ratio of the force input 210 to the maximum total drive force of the actual gear combination 145. The acceleration utilization in the drive case can be a ratio of the vehicle acceleration or vehicle deceleration 180 to the maximum vehicle acceleration 181. The force utilization in the braking case can be a ratio of the force input 210 to the minimum total resistance force of the actual gear combination 155. The acceleration utilization in the braking case can be a ratio of the vehicle acceleration or vehicle deceleration 180 to the maximum vehicle acceleration 181. Furthermore, the module for determining the force reserve M 300 can be configured to read out a value in the drive case from a characteristic map M 301 and/or in the braking case from a characteristic map M 302 depending on the force utilization and the acceleration utilization. Subsequently, the module for determining the force reserve M 300 can be configured to determine the acceleration reserve 161 by multiplication of the value in the drive case by a maximum vehicle acceleration 181 and in the braking case by the maximum vehicle deceleration 182.

By means of the characteristic map M 301 and/or the characteristic map M 302, the acceleration reserve 161 can be adapted adaptively to the driving situation, for example independently of the current speed. This leads, with a low configuration outlay, to a state of the drive system or drive train which is appropriate to the driving situation. The configuration outlay is low because it combines the driving situation, which depends, for example, on the driving resistance, utilization of the current drive force, current acceleration and maximum acceleration, in relative variables and can therefore be used simply for each driving situation. Preferably, an appropriate, but not excessively large, acceleration reserve 161 is determined, which leads to the electric motors of the drive systems being operated in an efficient operating range, for example with a torque of between 60 percent and 90 percent, and only if necessary in a higher range of the torque. Furthermore, changes in the drive system or in the drive train, for example power reduction on account of high temperature of the electric motors of the drive systems, are automatically taken into account.

Examples, the characteristic map M 301 and/or the characteristic map M 302 can have the following characteristic properties:

If the acceleration utilization is high and the force utilization is low, the acceleration reserve 161 can be small and/or equal to zero. This can lead to a target gear combination with a smaller maximum total drive force than the maximum total drive force of the actual gear combination.

If the acceleration utilization is low to negative and the force utilization is high, the acceleration reserve 161 can be high. This can lead to a target gear combination with a greater maximum total drive force than the maximum total drive force of the actual gear combination.

If the acceleration utilization is high and the force utilization is high, the acceleration reserve 161 can be small and/or equal to zero. This can lead to a target gear combination which continues to have a sufficient maximum total drive force.

If the force utilization is low to zero, the acceleration reserve 161 can be small and/or equal to zero. This can lead to a target gear combination with a smaller maximum total drive force than the maximum total drive force of the actual gear combination. This leads to the force utilization increasing again.

For example, the characteristic map M 301 and/or the characteristic map M 302 are/is configured in such a way that smooth transitions of the acceleration reserve are achieved in the event of a change in the force input. Furthermore, the characteristic map M 301 and/or the characteristic map M 302 can be configured in such a way that, in combination with an axle load-dependent distribution of the longitudinal force demand to the at least two drive systems, a moderate utilization of the adhesion value of the at least two drive systems results, wherein a further drive system of the at least two drive systems is preferably connected only if the utilization of the adhesion value of the at least two drive systems is high. The adhesion value means an adhesion of the wheels of the vehicle axles of the drive systems on the ground or the road. Furthermore, the method for determining a target gear combination can be transferred to any desired types and combinations of drive systems by the simple application of the characteristic map M 301 and/or the characteristic map M 302. Furthermore, the characteristic map M 301 and/or the characteristic map M 302 can have the same values or the same value depending on the force utilization and the acceleration utilization, i.e. the same characteristic map can be used for the drive case and the braking case.

Figure 9:
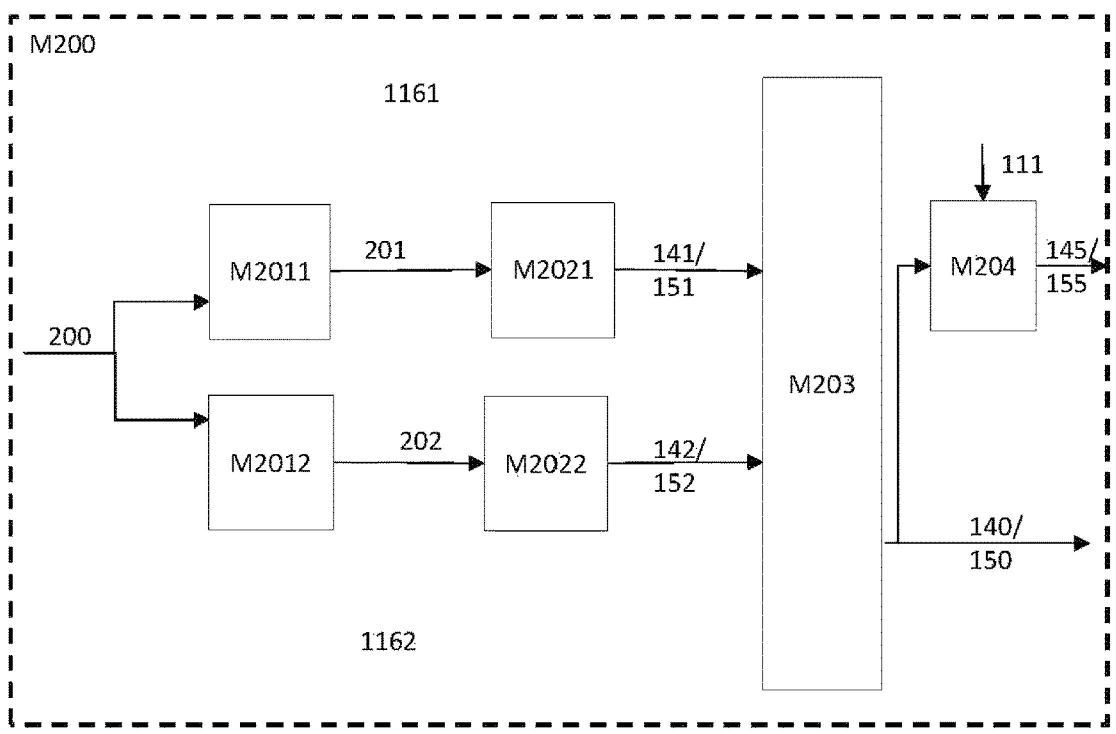
FIG. 9 shows a block diagram of a module for determining total drive forces which is illustrated in FIG. 3 and is configured to determine maximum total drive forces of the possible gear combinations and maximum total resistance forces of the possible gear combinations.

The module for determining the total drive forces M 200 (or for determining the total resistance forces) which is configured to determine the maximum total drive forces of the possible gear combinations 140, the minimum total resistance forces of the possible gear combinations 150, the maximum total drive force of the actual gear combination 145 and the minimum total resistance force of the actual gear combination 155 as a function of the vehicle speed 200 is shown by way of example in FIG. 9. The module for determining the total drive forces M 200 can be configured firstly to determine maximum drive forces and resistance forces for each of the at least two drive systems. By way of example, FIG. 9 shows a determination of maximum drive forces of a first drive system 141, a determination of minimum resistance forces of a first drive system 151, a determination of maximum drive forces of a second drive system 142 and a determination of minimum resistance forces of a second drive system 152 of the at least two drive systems.

To determine the maximum drive forces of the first drive system 141 and to determine the minimum resistance forces of the first drive system 151 in the individual gears of the transmission of the first drive system, the module for determining the total drive forces M 200 can comprise a module M 2011 and a module M 2021. Firstly, the module for determining the total drive forces M 200 can be configured to read out rotational speeds of the motor 201 of the first drive system for each gear depending on the vehicle speed 200 from the module M 2011. Subsequently, the module M 2021 can be configured to determine the maximum drive forces of the first drive system 141 and the minimum resistance forces of the first drive system 151 for each gear depending on the rotational speeds of the motor 201 of the first drive system. Firstly, for this purpose, the module M 2021 can be configured to determine maximum drive torques and resistance torques for each gear of the first drive system depending on the rotational speeds of the motor 201 and subsequently to determine the maximum drive forces of the first drive system 141 and the minimum resistance forces of the first drive system 151 depending on the maximum drive torques and resistance torques and transmission ratios for each gear of the first drive system.

To determine the maximum drive forces of the second drive system 142 and to determine the minimum resistance forces of the second drive system 152 in the individual gears of the transmission of the first drive system, the module for determining the total drive forces M 200 can comprise a module M 2012 and a module M 2022. Firstly, the module for determining the total drive forces M 200 can be configured to read out rotational speeds of the motor 202 of the second drive system for each gear depending on the vehicle speed 200 from the module M 2012. Subsequently, the module M 2022 can be configured to determine the maximum drive forces of the second drive system 142 and the minimum resistance forces of the second drive system 152 for each gear depending on the rotational speeds of the motor 202 of the second drive system. Firstly, the module M 2022 can be configured to determine maximum drive torques and resistance torques for each gear of the second drive system depending on the rotational speeds of the motor 202 of the second drive system and subsequently to determine the maximum drive forces of the second drive system 142 and the minimum resistance forces of the second drive system 152 depending on the maximum drive torques and resistance torques and transmission ratios for each gear of the second drive system.

Subsequently, the module for determining the total drive forces M 200 can be configured to determine the maximum total drive forces of the possible gear combinations 140 and the minimum total resistance forces of the possible gear combinations 150 by means of a module M 203. For this purpose, the module M 203 can be configured to firstly determine the possible gear combinations. During the determination of the possible gear combination, the individual transmissions of the drive systems can also be taken into account during idling. Furthermore, the module 203 can be configured to add the maximum drive forces of the at least two drive systems, for example the maximum drive force of the first drive system 141 and the maximum drive force of the second drive system 142, for the possible gear combination to determine the maximum total drive forces of the possible gear combinations 140. Furthermore, the module 203 can be configured to add the minimum resistance forces of the at least two drive systems, for example the minimum resistance force of the first drive system 151 and the minimum resistance forces of the second drive system 152, for the possible gear combination to determine the minimum total resistance forces of the possible gear combinations 150. If the idling of the transmissions of the at least two drive systems is taken into account for the possible gear combinations, a drive force and/or a resistance force of zero, for example, is assumed for the drive system whose transmission is idling.

Subsequently, the module for determining the total drive forces M 200 can be configured to determine the maximum total drive force of the actual gear combination 145 and the minimum total resistance force of the actual gear combination 155 by means of a module M 204 from the maximum total drive forces of the possible gear combinations 140, the minimum total resistance forces of the possible gear combinations 150 and the actual gear combination 111.

Figure 10:
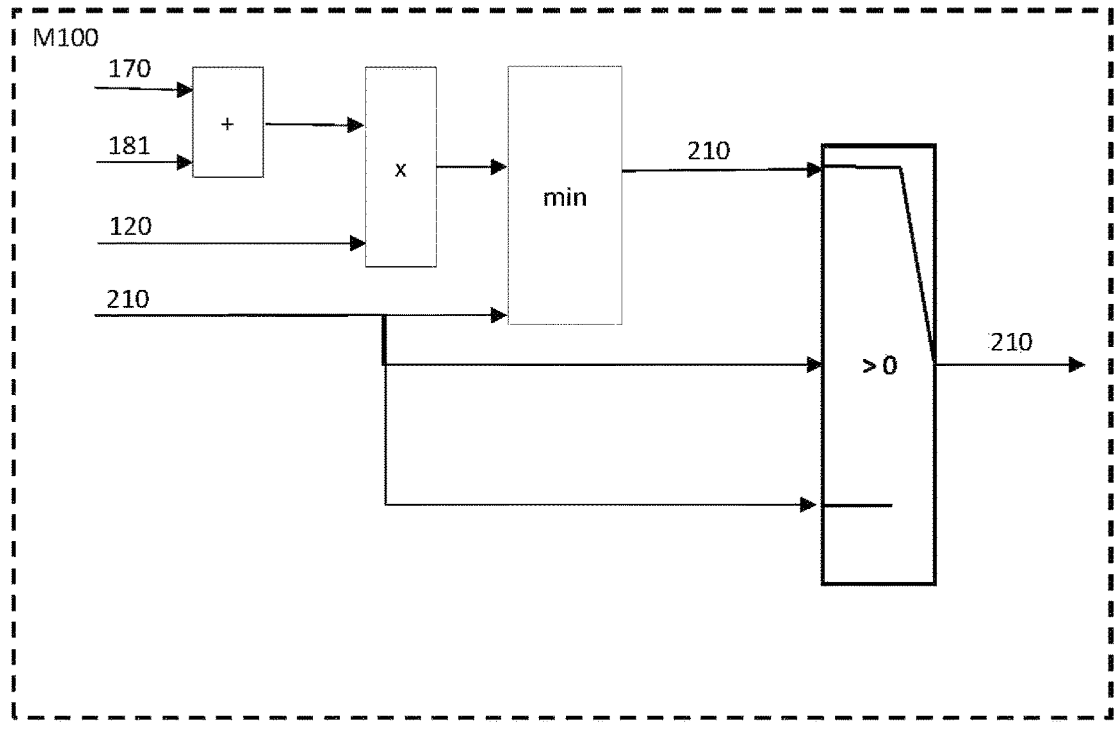
FIG. 10 shows a block diagram of the module for determining a limited force input which is illustrated in FIG. 3 and is configured to limit a force input.

The module for determining a limited force input M 100 which is configured to limit the force input 130 is illustrated by way of example in FIG. 10. The module for determining the limited driving input M 100 can be configured not to limit the force input 210 if the force input 210 is less than or equal to zero. Furthermore, the module for determining the limited force input M 100 can be configured to limit the force input 210 if the force input 210 is greater than zero. The limited force input 210 can be, for example, the minimum of the force input 210 which is predefined, for example, by the driver and/or the automated driving system, and a value which is formed from the multiplication of a sum of the environmental acceleration 170 and the maximum vehicle acceleration 181 by the vehicle mass 120.

Furthermore, the module for determining the force reserve M 300 can also be configured to process the environmental acceleration 170 directly, for example if the force input 210 is not limited, that is to say for example if the module for determining the limited force input M 100 is not present. For this purpose, the module M 300 for determining the force reserve M 300 can be configured to offset the environmental acceleration 170 with the force input M 300. For this purpose, for example, firstly the environmental acceleration 170 is multiplied by the vehicle mass 120 and the force input 210 is added to this value, that is to say the force input 210 is calculated from an addition of the force input 210 to this value. All further calculation steps for which the module for determining the force reserve M 300 is configured according to the invention can subsequently proceed analogously, for example as shown in FIG. 8 and described in the associated description.

LIST OF REFERENCE NUMERALS

1 Vehicle
2 Electric motor
3 Transmission
4 Vehicle axles
41 First rear axle
42 Second rear axle
43 Front axle
100 Controller

110 Target gear combination
111 Actual gear combination
112 Gear combinations with sufficient total drive force or total resistance force
113 Gear combinations with sufficient total drive force
114 Gear combinations with sufficient total resistance force
115 Gear combinations with small changes in the gears of the transmissions of the drive systems
120 Vehicle mass
130 Longitudinal force demand
140 Maximum total drive forces of the possible gear combinations
141 Maximum drive forces of the first drive system (for each gear)
142 Maximum drive forces of the second drive system (for each gear)
145 Maximum total drive force of the actual gear combination
150 Minimum total resistance forces of the possible gear combinations
151 Minimum resistance forces of the first drive system (for each gear)
152 Minimum resistance forces of the second drive system (for each gear)
155 Minimum total resistance force of the actual gear combination
160 Force reserve
161 Acceleration reserve
170 Environmental acceleration
180 Vehicle acceleration or vehicle deceleration
181 Maximum vehicle acceleration
182 Maximum vehicle deceleration
200 Vehicle speed
201 Rotational speeds of the first electric motor (for each gear)
202 Rotational speeds of the second electric motor (for each gear)
210 force input
1000 Method for determining a target gear combination
M100 Module for determining a limited force input
M200 Module for determining total drive forces
M300 Module for determining a force reserve
M400 Module for determining a target gear combination
M401 Module for determining possible gear combinations
M402 Module for determining an optimum gear combination
M403 Module for forming a hysteresis

What is claimed is:

1. A method for determining a target gear combination for a vehicle having at least two drive systems, wherein each drive system drives a vehicle axle and each of the two drive systems has at least one motor and at least one transmission, wherein at least one of the transmissions has at least two gears, the method comprising:

determining the target gear combination based on (i) a route profile lying ahead of the vehicle as determined by a digital map or by a sensor system of the vehicle, (ii) a speed of at least one surrounding vehicle, (iii) an acceleration of at least one surrounding vehicle, or (iv) a distance from the at least one surrounding vehicle, wherein the surrounding vehicle is another vehicle driving ahead or behind the vehicle; and selecting and activating the determined target gear combination for the transmissions between the drive axles and the motors.

2. The method according to claim 1, wherein the target gear combination is determined based on of a comparison of a longitudinal force demand with maximum total drive forces of possible gear combinations of the at least two gears of the at least two transmissions and minimum total resistance forces of the possible gear combinations of the at least two gears of the at least two transmissions, wherein the maximum total drive forces are a sum of maximum drive forces of the possible gear combinations and the minimum total resistance forces are a sum of minimum resistance forces of the possible gear combinations.

3. The method according to claim 1, wherein a longitudinal force demand is determined based on the route profile lying ahead; and wherein the longitudinal force demand is determined based on the speed and the acceleration of the at least one vehicle travelling ahead or behind based on the distance from the at least one vehicle travelling ahead or behind.

4. The method according to claim 1 wherein:

if a longitudinal force demand is greater than or equal to zero, the target gear combination is determined by a comparison of a longitudinal force demand with maximum total drive forces, and if the longitudinal force demand is not greater than or equal to zero, the target gear combination is determined by a comparison with minimum total resistance forces.

5. The method according to claim 1, wherein:

if no maximum total drive force of maximum total drive forces is greater than or equal to a longitudinal force demand, a gear combination which has a maximum total drive force is selected as the target gear combination; and if no maximum total resistance force of minimum total resistance forces is less than or equal to the longitudinal force demand, a gear combination which has a minimum total resistance force is selected as the target gear combination.

6. The method according to claim 5, wherein, if in a plurality of gear combinations in which in each case a same smallest possible number of gears is changed, a gear combination which has a smallest maximum total drive force of the maximum total drive forces and a greatest minimum total resistance force of the minimum total resistance forces is selected.

7. The method according to claim 1, wherein the target gear combination is determined in such a way that a gear combination is selected in which a gear is changed in a smallest possible number of the at least two transmissions, and wherein the target gear combination is determined in such a way that a gear is changed in at least one transmission of the at least two transmissions.

8. The method according to claim 1, wherein a longitudinal force demand is determined from a force reserve and a force input.

9. The method according to claim 8, wherein the force reserve is determined from an acceleration reserve and a vehicle mass.

10. The method according to claim 9, wherein the acceleration reserve is determined from a force utilization and an acceleration utilization.

11. The method according to claim 10, wherein the acceleration reserve is determined from a characteristic map which has a value for each of the force utilization and the acceleration utilization, wherein:

if the force input is greater than or equal to zero, the value is multiplied by a maximum vehicle acceleration, and if the force input is not greater than or equal to zero, the value is multiplied by a maximum vehicle deceleration.

12. The method according to claim 11, wherein, if the force input is greater than or equal to zero, the force utilization is determined from a ratio of the force input to a maximum total drive force of an actual gear combination of the at least two transmissions, and if the force input is not greater than or equal to zero, the force utilization is determined from a ratio of the force input to a maximum total resistance force of the actual gear combination of the at least two transmissions; and wherein, if the force input is greater than or equal to zero, the acceleration utilization is determined from a ratio of a vehicle acceleration to the maximum vehicle acceleration, and if the force input is not greater than or equal to zero, the acceleration utilization is determined from a ratio of a vehicle deceleration to the maximum vehicle deceleration.

13. The method according to claim 9, wherein the acceleration reserve is determined based on the route profile lying ahead, and wherein the acceleration reserve is determined based on the speed and the acceleration of the at least one vehicle driving ahead or behind, and based on the distance from the at least one vehicle driving ahead or behind.

14. The method according to claim 9, wherein the force input is limited.

15. The method according to claim 14, wherein the limited force input is determined from a minimum of the force input and a sum of a resistance acceleration and a maximum vehicle acceleration times the vehicle mass.

16. A non-transitory computer-readable storage medium storing instructions thereon, the instructions when executed by one or more processors cause the one or more processors to execute the method according to claim 1.

17. A vehicle having at least two drive systems, wherein each of the two drive systems is provided for driving in each case one vehicle axle and each of the two drive systems comprises:

an electric motor and at least one transmission with in each case at least two gears, wherein the electric motor is in operative connection with the transmission; and a controller which is configured to carry out the method according to claim 1.

* * * * *